United States Patent

Sauer

Patent Number: 6,023,815
Date of Patent: Feb. 15, 2000

[54] HOSE CLIP

[75] Inventor: Heinz Sauer, Ronneburg, Germany

[73] Assignee: Rasmussen GmbH, Maintal, Germany

[21] Appl. No.: 09/186,454

[22] Filed: Nov. 5, 1998

[30] Foreign Application Priority Data

Nov. 12, 1997 [DE] Germany .......................... 197 50 010

[51] Int. Cl.⁷ ................................................. B65D 63/00
[52] U.S. Cl. .................. 24/20 R; 24/20 TT; 24/20 CW; 24/20 EE; 24/23 EE
[58] Field of Search ................................. 24/20 R, 20 W, 24/20 CW, 20 EE, 23 EE

[56] References Cited

U.S. PATENT DOCUMENTS

| | | | |
|---|---|---|---|
| 4,742,600 | 5/1988 | Calmettes et al. | 24/20 CW |
| 4,890,360 | 1/1990 | Calmettes et al. | 24/20 CW |
| 5,103,535 | 4/1992 | Ishijima | 24/20 R |
| 5,283,931 | 2/1994 | Oetiker | 24/20 R |

Primary Examiner—Victor N. Sakran
Attorney, Agent, or Firm—Darby & Darby

[57] ABSTRACT

A hose clip is made of a metal band having a first end portion and a second end portion. The first end portion and the second end portion overlap each other when the hose clip is in a closed position so that the second end portion is disposed radially inwardly with respect to the first end portion. The second end portion has a first radially outwardly directed closure member. The second end portion has a first cutting edge having a first portion adjoining the first closure member. The first portion extends substantially transversely with respect to a peripheral direction of the band. The second end portion has a first clamping jaw protruding radially outwardly from the band. In the closed position, the first clamping jaw is not overlapped by the first end portion. The first portion of the first cutting edge defines a projection that is oriented towards the first clamping jaw. The projection extends parallel to the band. The first end portion has a second closure member protruding radially inward at an inclined angle. The second closure member extends over the entire axial width of the band. The first end portion has a second clamping jaw protruding radially outwardly from the band. In the closed position, the first closure member and the second closure member engage each other so that the second closure member engages radially inside of the projection.

16 Claims, 3 Drawing Sheets

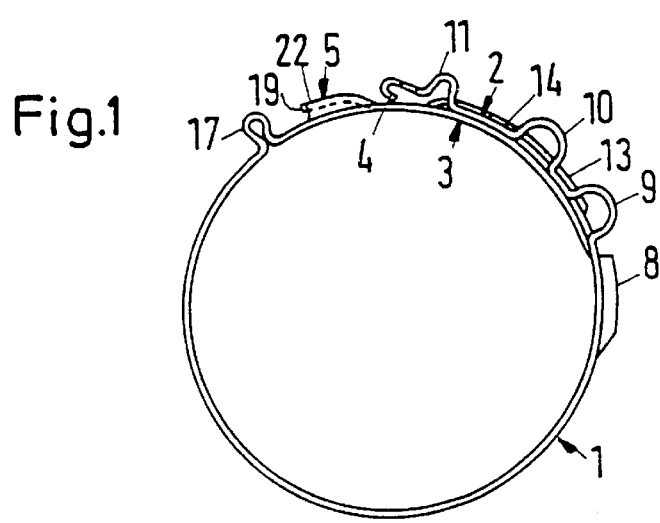
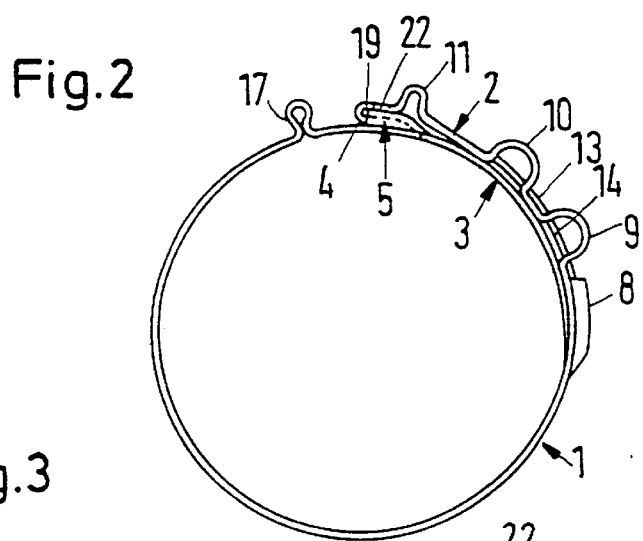
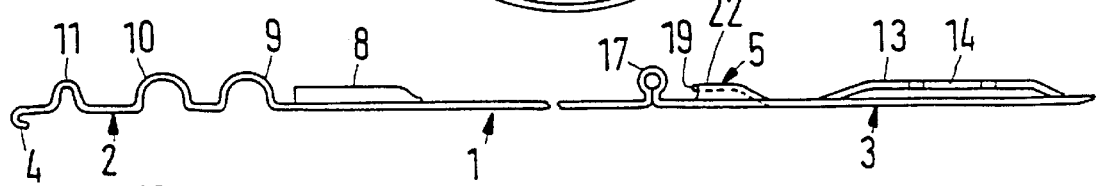
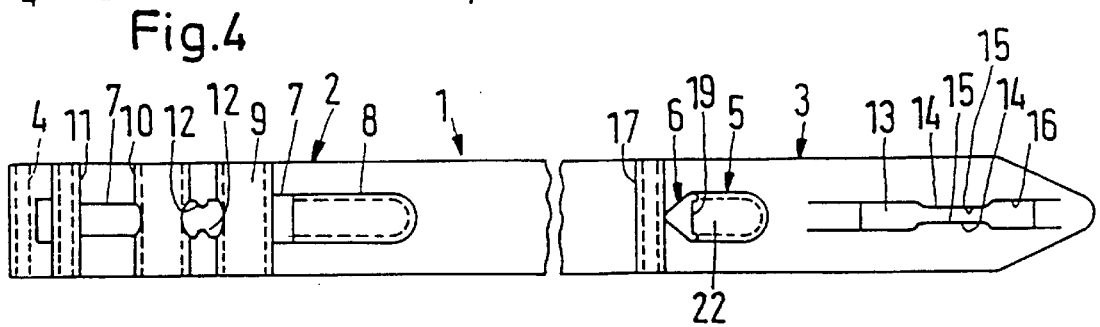

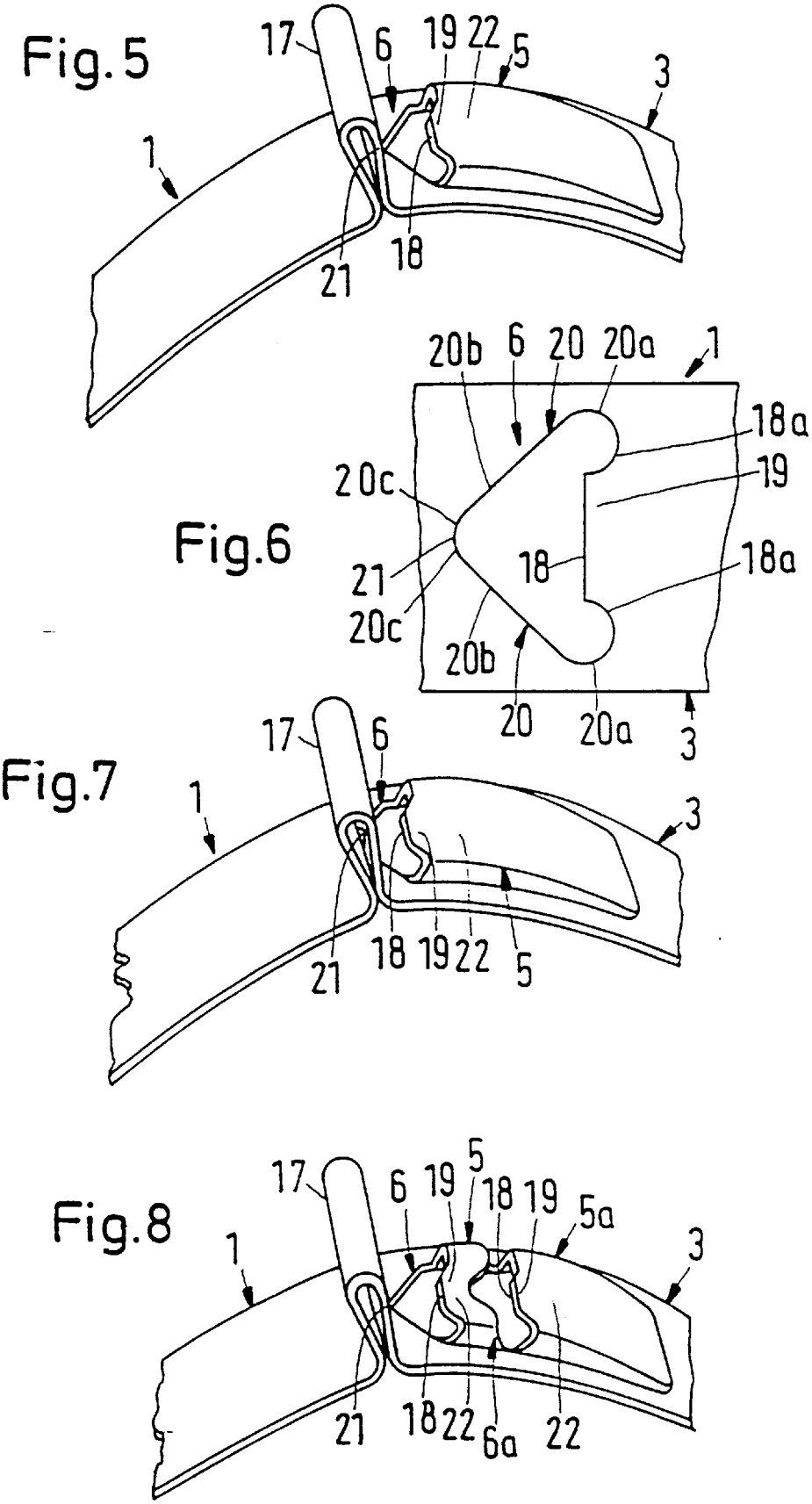

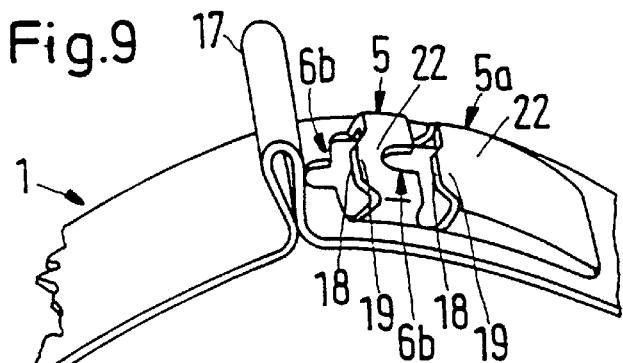
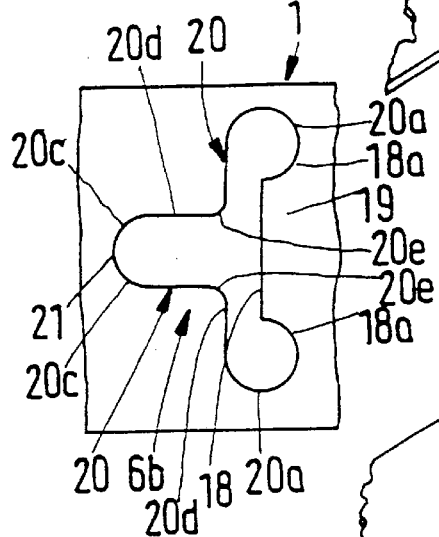
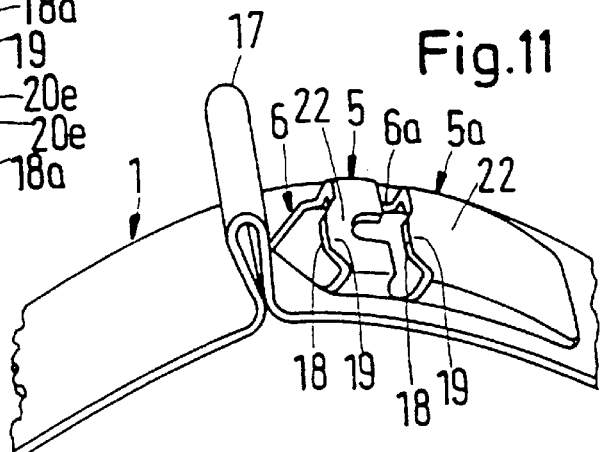
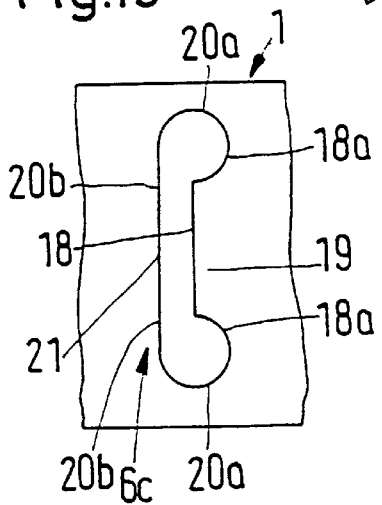
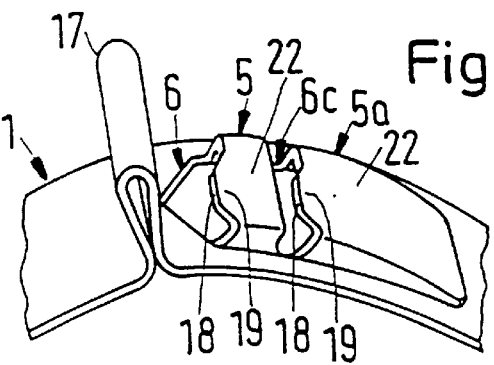
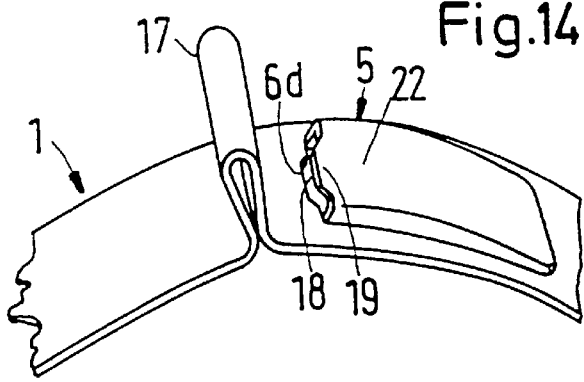

HOSE CLIP

BACKGROUND OF THE INVENTION

1. Field of the Invention

The present invention relates to a clip. More specifically, the present invention relates to a hose clip made of a metal band and having overlapping end portions. When the clip is in the closed position, a closure member on the radial outer end portion engages radially inside or underneath a projection on the radial inner end portion.

2. Discussion of the Related Art

A hose is disclosed in German reference DE 42 37 330 C1, which corresponds to U.S. Pat. No. 5,353,478, which is commonly assigned to the Assignee of the present invention, the disclosures of which are hereby incorporated by reference. A first closure member 5 is formed in the band of the hose clip by making an incision that extends transversely to the longitudinal axis of the band. In the plan view, the incision is slightly convex with respect to the peripheral direction of the clip. The band material that is disposed on one side of the incision is pressed radially outwardly, approximately in the shape of a fish scale. A second closure member in the shape of a hook 4 is bent radially inwardly by more than 90°. Second closure member 4 is disposed at the free end of the radial outer end portion. Closure members 4, 5 form an undercut portion which can be brought into locking engagement. In the closed position, to prevent closure member 5 from being torn open by hook 4 (especially when the closed clip is subject to pressure applied by the clamped hose), the incision must not extend very far in the peripheral direction from the free end of projection 5. Thus, the free front edge of projection 5 is only slightly inclined in the upwardly or radially outward direction. The free edge of projection 5 is disposed in one plane. When the clip is in the closed position, hook 4, which extends across the entire width of the band, bears either with its one transverse edge against two mutually axially oppositely disposed locations on the edge or with its inner surface bearing against the entire edge of projection 5. If a radially outwardly directed force is unintentionally applied to the outer end portion of the band, hook 4 can move away from the edge of projection 5, thereby causing the clip to unintentionally open.

SUMMARY OF THE INVENTION

It is, therefore, an object of present invention to provide a hose clip that prevents unintentional opening of the clip by radial forces acting upon the radially outer end portion of the band.

This object is solved in accordance with a currently preferred exemplary embodiment of the present invention in which a hose clip has a first cutting edge that, in part, defines a projection that is oriented towards a first clamping jaw. The projection extends parallel to the band. A second closure member engages underneath the projection when the clip is in the closed position.

The projection prevents the second closure member from moving in the radial outward direction, without requiring the cutting edge to be extended further into the side walls of the first closure member than has previously been required.

The projection is preferably substantially trapezoidal in shape. The projection, therefore, has, at its free end, a relatively long, linear transverse edge, which, when the clip is in the closed position is in linear contact with the second closure member. Thus, neither of the closure members is subject to a concentrated load.

The first cutting edge has a second and a third portion, which have approximately equal lengths. Each portion starts from an opposite base of the projection. In a pre-bent position, the portions converge through a circular arc at a predetermined location that is disposed opposite to the projection. The transitions from the base of the projection to the respective portions are each in the shape of a circular arc. Thus, stress concentrations that develop at the ends of the first portion when the clip is in the closed, clamped condition are largely avoided. The cutting edge defines a relatively wide hole in the peripheral direction of the band. To form the cutting edge (i.e., the hole), a stamping punch in a stamping tool can be used. The stamping tool is used in the production of the clip. The stamping punch has a larger and, therefore, more stable cross-section than a punching blade, which has been previously used to form a narrow incision in a band.

An intermediate portion of the second and third portion is disposed between each circular arc at the base of the projection and the predetermined location. The intermediate portions converge through a circular arc at the predetermined location so that stress concentrations are also avoided in this area of the band.

If each intermediate portion is linear and inclines with respect to the longitudinal axis of the band, the cross-section of the stamping punch will be sufficiently large and its use will be stable. Additionally, there will still be a relatively large surface area of the band adjacent to the hole so that the band will have a relatively high flexural strength to resist outward bending of the band in the region between the first clamping jaw and the first closure member as a result of a displacement of material of a hose into that region when the hose is clamped by the clip.

The band area adjacent to the hole can be increased by providing each intermediate portion with a rounded corner that protrudes into the hole. The portions of the intermediate portion immediately adjacent to the rounded corner are preferably linear. The band area is particularly large if the linear portions of each intermediate portion enclose a right angle about the rounded corner (i.e., the linear portions are perpendicular to each other).

If the predetermined location is disposed near the first clamping jaw, the region of the band between the first clamping jaw and the first closure member can be relatively short and, therefore, highly resistant to bending. This region can be particularly short in the peripheral direction if the predetermined location is disposed in a wall of the undulation that forms the first clamping jaw.

The first closure member preferably has a ridge, at least in a portion which adjoins the projection that extends parallel to the band. Thus, the closure member withstands high clamping forces in the peripheral direction without deforming.

A second cutting edge, which corresponds in shape and function to the first cutting edge, is preferably formed in the band. The second cutting edge forms a third closure member, which corresponds in shape and function to the first closure member. A clip having first and third closure member may be used to clamp objects (e.g., hoses) having two different nominal diameters. The distance between the projections of the first and third closure members is equal to $\pi$ times the difference in diameters between the two hoses of different diameter that can be clamped using the first and third closure members, respectively.

BRIEF DESCRIPTION OF THE DRAWING FIGURES

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 1 is a side view of a hose clip in accordance with the present invention, where the hose clip is shown in the open, unclamped position;

FIG. 2 is a side view of the clip according to FIG. 1, but in the closed, clamped position;

FIG. 3 is a side view of the clip band, before it is bent into the circular shape according to FIGS. 1 and 2 (i.e., in the pre-bent position);

FIG. 4 is a plan view of the clip band of FIG. 3;

FIG. 5 is a partial perspective view of the clip according to FIG. 1;

FIG. 6 is a partial plan view of the clip band according to FIG. 5, in the pre-bent position;

FIG. 7 is a partial perspective view of a second embodiment of the clip, where the first clamping jaw and the first closure member are disposed closer together;

FIG. 8 is a partial perspective view of a third embodiment of the clip, where the clip is provided with a third closure member;

FIG. 9 is a partial perspective view of a fourth embodiment of the clip, where the cutting edges next to the closure members are shaped differently;

FIG. 10 is a partial plan view of clip according to FIG. 9, showing the shape of the cutting edges in the pre-bent position;

FIG. 11 is a partial perspective view of a fourth embodiment of the clip, where the second cutting edge corresponds to the clip of FIG. 9;

FIG. 12 is a partial perspective view of a fifth embodiment of the clip, where the second cutting edge defines a hole that is relatively narrow in the peripheral direction;

FIG. 13 is a partial plan view, in the pre-bent position, of the clip according to FIG. 12; and FIG. 14 is a partial perspective of a sixth embodiment of the clip, where a single cutting edge defines a narrow slot.

DETAILED DESCRIPTION OF THE PREFERRED EMBODIMENT

Referring now to FIGS. 1–6, a hose clip for securing a hose to a pipe or socket piece is illustrated. The hose clip is comprised of a spring steel band 1 which is bent into an approximately circular configuration so that the end portions 2 and 3 thereof overlap. A closure member 4 is disposed at the free end of outer end portion 2. Closure member 4 is preferably in the form of a hook which is bent around radially inwardly by approximately 180°. A second closure member 5 is formed in end portion 3. Second closure member 5 has a peripheral cutting edge 6 (see FIGS. 4–6). Second closure member 5 is formed by pressing out the band material on the one side of cutting edge 6 so that the pressed-out portion is approximately in the shape of a bead that extends in the peripheral direction of the clip. Closure member 4 selectively engages under the closure member 5, thereby placing the clip in the closed position (see FIG. 2). Because, in the closed position, closure member 4 engages under closure member 5, if closure members 4, 5 are subject to an unintentional radial force acting upon the outer end portion 3, closure members 4, 5 do not move apart in the radial direction, which would unintentionally open the clip.

End portion 2 has a slot 7 (see FIG. 4) which extends in the peripheral direction of the band. A radially outwardly projecting bead 8, which extends in the peripheral direction of the band, opens towards slot 7. Slot 7 is also spanned by radially outwardly projecting undulations 9 and 10, and by a clamping jaw 11, which is also in the form of an undulation. Undulations 9, 10, and to a more limited extent clamping jaw 11, provide band 1 with a certain elasticity in the peripheral direction, and, at the same time, prevent lateral expansion of slot 7. A clamping tool (e.g., pliers) can be placed on clamping jaw 11 and on a clamping jaw 17 on end portion 3 to move the closure members 4 and 5 from the open position of FIG. 1 to the closed position of FIG. 2.

Referring now to FIG. 4, slot 7 has mutually facing flaps 12 that project into the slot with respect to the transverse direction of the band from the longitudinal edges thereof. Flaps 12 project radially inwardly between undulations 9 and 10 approximately in the center of the length of slot 7.

A web 13 projects radially outwardly along the inner end portion 3 into slot 7 of end portion 2. Web 13 can be locked in slot 7. Web 13 extends in the peripheral direction of the clip, at a distance from the free end of inner end portion 3, which distance corresponds to at least the thickness of the band. Mutually oppositely disposed cutaway portions 14 are formed in the edges of the web 13, thereby forming flaps 15. Cutaway portions 14 extend in the longitudinal or axial direction and in the peripheral direction of the clip. Cutaway portions 14 are disposed at a distance from the ends of the web 13. Cutaway portions 14 radially guide flaps 12. In the peripheral direction of the clip, web 13 is shorter than slot 7. Thus, after web 13 has been inserted into slot 7, web 13 is displaceable in slot 7 in the peripheral direction of the clip. During this movement, at least part of the length of web 13 is receivable in bead 8, as shown in FIG. 2. Web 13 is formed by incisions made in the band 1 and the band material is then pressed out between the incisions. The cutaway portions 14 and flaps 15, which corresponds to the cutaway portions 14, are formed on the lateral edges of slot 16 (see FIG. 4). The cutaway portions 14 remain after the material of the web has been pressed out of the band 1. The indented flaps 15 are formed in the non-pressed out portion of the band. The clamping jaw 17 is in the form of an undulation which is bent radially outwardly from the the band material at a greater distance from the free end of end portion 3 than closure member 5. Clamping jaw 17 is compressed at its radially inner ends as illustrated in FIG. 3. A clamping tool (e.g., pliers) can have one clamping jaw placed at the radial inner end of clamping jaw 17 and its other clamping jaw at the radial inner end of clamping jaw 11 to move the clip from the open position of FIG. 1 to the closed position of FIG. 2.

Referring now to FIG. 6, a cutting edge 6 has a first portion 18 extending substantially transversely with respect to the band 1. In other words, first portion 18 extends in the longitudinal or axial direction of band 1. First portion 18 delimits a trapezoidal projection 19 that extends parallel to the band 1 and projects towards clamping jaw 17. Closure member 4 engages under projection 19 when the clip is closed (see FIG. 2). Cutting edge 6 also has a second and a third portion 20, which have approximately equal lengths. Each portion 20 starts from an opposite base of projection 19. The transitions 20a from the base of projection 19 to portions 20 are each in the shape of a circular arc. Portions 20 also converge together through a circular arc 20c, at a location or point 21, which is disposed opposite to projection 19.

A linear intermediate portion 20b of portion 20 is disposed between each circular arc 20a and location 21 of the cutting edge 6. Intermediate portion 20b is inclined with respect to the longitudinal direction of band 1. Location 21 is disposed adjacent to clamping jaw 17 (see, for example, FIGS. 4 and 5). The transitions 18a from the flanks of projection 19 into the circular arcs 20a of portions 20 are also rounded in the form of a circular arc.

Closure member 5 has a flat ridge that extends parallel to the band at least in a portion 22, which adjoins projection 19 (see FIGS. 1–5).

In operation, end portions 2 and 3 are first placed in the open, relaxed position as illustrated in FIG. 1. This open position is determined as a result of the co-operation between flaps 12 and web 13. The co-operation of flaps 12 with web 13 is known to those skilled in the art based on the teachings of, for example, German Application No. DE 42 37 330 C1, which corresponds to U.S. Pat. No. 5,353,478, the disclosure of which has previously been incorporated by reference.

While in the open position of FIG. 1, the clip is pushed over the hose that is to be firmly clamped. The jaws of the pliers are placed on the mutually distant sides of the clamping jaws 11 and 17. The end portions 2 and 3 are then pushed in the peripheral direction at least far enough for the hook-like closure member 4 to slide over the projection 19. Compression of the clamping jaws 11 and 17 is restricted by the free end of end portion 2 which will abut clamping jaw 17 if the clip is compressed too far. After the clamping tool has been released, the clip is able to slightly expand again due to the pressure of the hose, until the hook-like closure member 4 engages under the projection 19 of closure member 5, as shown in FIG. 2. In this closed position, closure member 4, which extends over the entire width of the band (see FIG. 4), is disposed with its radially inner edge abutting against or immediately adjacent to the two mutually axially oppositely disposed locations on the edges of end portion 3. The two axially oppositely disposed locations extend approximately radially outwardly because closure member 5 has been pressed radially out of the band. The pressing out of closure member 5 causes the edges of the circular arcs 20a and the rounded transitions 18a to deform. Additionally, in the closed position, the radial inner edge of projection 19 is disposed, at least linearly, on the surface of closure member 5, which is opposite to the radial inner edge of closure member 4. Thus, in this closed position, closure members 4 and 5 reliably engage with each other and will not move apart radially, even if an external radially outwardly directed force is unintentionally applied to outer end portion 2 in the vicinity of closure members 4 and 5. The clip can only be opened again when the clamping jaws 11 and 17 are, once again, pressed toward one another with a force sufficient to radially push closure members 4, 5 apart in the peripheral direction, thereby overcoming the biasing force that is being applied to end portions 2 and 3 in the peripheral direction of the band. This biasing force is a combination of the natural biasing force of the band and the force applied by the hose that the clip is clamped to.

Although the circular arcs 20a and the rounded transitions 18a are deformed when the closure member 5 is pressed out of the band material, as shown roughly in FIG. 5, they nonetheless provide a smooth transition into the flanks of the projection 19, into each other and into the linear portion 20b, without being subject to stress concentration by the radially outwardly directed pressure applied by the hose when the clip is in the closed position. Because the stress concentrations are minimized, the risk of closure member 5 tearing open in the area of the rounded transitions and circular arcs due to the pressure of the hose is, therefore, largely minimized.

Since the cutting edge 6, or the hole delimited by it, is approximately heart-shaped in the radial plan view, the regions of the band which are disposed axially outside the inclined extending portions 20b of cutting edge 6 have a relatively large area, so that when the clip is closed and clamped, the band is not bent outwardly and radially in those regions as a result of the material of the hose being compressed by the clip during the clamping (see FIG. 6).

The shape of cutting edge 6 can advantageously be punched using a stamping punch. The cross-sectional contour of the stamping punch corresponds to the contour of the hole that is defined by cutting edge 6. The cross-sectional area of the stamping punch corresponds, therefore, to the size of the hole. Thus, the stamping punch is very stable and steady during use, even over relatively long periods of time.

FIG. 7 illustrates a second embodiment of the clip according to the present invention. The clip of FIG. 7 differs from the clip according to FIGS. 1–6 simply in that the location 21 of the cutting edge 6, which is disposed opposite to projection 19, is disposed in the wall of the undulation that forms clamping jaw 17. More specifically, location 21 is disposed in the portion of the wall facing projection 19. Accordingly, the distance between projection 19 and clamping jaw 17 in the FIG. 7 embodiment is somewhat less than the distance between projection 19 and clamping jaw 17 in the FIG. 1–6 embodiment. Thus, the risk of band 1 bending in the region between projection 19 and clamping jaw 17 due to the hose pressure is reduced in the clip embodiment illustrated in FIG. 7.

Referring now to FIG. 8, a third embodiment of the clip is illustrated. The clip according to FIG. 8 differs from the clip according to FIGS. 1–6 simply in that a further cutting edge 6a is formed in band 1. Cutting edge 6a corresponds in shape and function to cutting edge 6. Thus, a further closure member 5a, which corresponds in shape and function to closure member 5, is provided by cutting edge 6a. The pointed end of the cutting edge 6a corresponds to location 21 in the preceding embodiments. The pointed end of cutting edge 6a extends up into portion 22 of closure member 5, as illustrated in FIG. 8. When the band is in the pre-bent or flat condition (i.e., the band lies in one plane), cutting edge 6a has the same shape as cutting edge 6, which is illustrated in FIG. 6. Therefore, the clip of FIG. 8 can be used to clamp hoses of two different nominal diameters to a socket piece of corresponding diameter. The distance between the projections 19 of closure members 5 and 5a is equal to $\pi$ times the difference in the diameters between the two hoses in the clamped region of the hose.

Referring now to FIGS. 9 and 10, a fourth embodiment of the clip is illustrated. The clip of FIGS. 9 and 10 differs from that according to FIG. 8 simply in that the cutting edges 6b are somewhat differently shaped. In other words, cutting edges 6b are in the form as is shown in the pre-bent or flat condition of FIG. 10. Each intermediate portion 20d has a rounded corner 20e that projects into the hole that is defined by cutting edge 6b. The portions of the intermediate portion 20d immediately adjacent to corner 20e are linear. As a result, although the cross-sectional area of the stamping punch used to punch the hole is somewhat reduced as compared to the previous embodiments, the surface of the region of the band disposed between the closure member 5 and the clamping jaw 17 is correspondingly larger. Thus, the flexural strength of the band 1 in this region is also greater than in the FIG. 8 embodiment. Even though the cross-sectional area of the stamping punch is reduced, its stability is still sufficient to operate.

Referring now to FIG. 11, a fifth embodiment of the clip is illustrated. The clip of FIG. 11 differs from that according to FIGS. 9 and 10 simply in that the two different cutting edges 6 and 6a of the preceding embodiments are combined.

Referring now to FIGS. 12 and 13, a sixth embodiment of the clip is illustrated. The clip of FIGS. 12 and 13 differs from that according to FIG. 11 simply in that the linear intermediate portions 20b and the linear transverse edge of projection 19 are disposed opposite to each other in a parallel relationship when in the pre-bent position as shown in FIG. 13. Therefore, the hole which is delimited by cutting edge 6c is somewhat narrower in the peripheral direction, and, accordingly, the cross-section of the stamping punch is somewhat smaller than the punch of the FIG. 11 embodiment. The side remote from projection 19, of portion 22 of the ridge of the closure member 5, does not have a cutaway portion. Thus, a higher clamping force in the peripheral direction can be withstood by the clip of FIGS. 12 and 13.

Referring now to FIG. 14, a seventh embodiment of the clip according to the present invention is illustrated. The clip of FIG. 14 differs from that of FIGS. 1–6 simply in that the cutting edge 6d defines a slot which corresponds to the trapezoidal shape of the projection 19 and its adjoining portions. The clip of FIG. 14 is advantageous because the area of the band between projection 19 and the clamping jaw 17 is even more solid. Therefore, the clip of FIG. 14 has even greater flexural strength. Additionally, the stamping punch can be designed so that it can simultaneously create cutting edge 6d and press out closure member 5 from the band material. In other words, the punching out of the slot and the pressing out of the closure member can take place in one operation. However, because of the small width of the slot in cutting edge 6d, no rounded regions or circular arcs are formed at the ends of the slot.

Having described the presently preferred exemplary embodiment for a clip in accordance with the present invention, it is believed that other modifications, variations and changes will be suggested to those skilled in the art in view of the teachings set forth herein. For example, the use of web 13 and flaps 12 can be omitted. Alternatively, web 13 may be replaced by a bead which extends in the peripheral direction. Additionally, instead of being made of spring steel, band 1 can be made of a permanently deformable metal. It is, therefore, to be understood that all such modifications, variations, and changes are believed to fall within the scope of the present invention as defined by the appended claims.

What is claimed is:

1. A hose clip comprising:

a metal band having a first end portion and a second end portion, said first end portion and said second end portion overlapping each other when said hose clip is in a closed position so that said second end portion is disposed radially inwardly with respect to said first end portion, said second end portion having a first radially outwardly directed closure member, said second end portion having a first cutting edge having a first portion adjoining said first closure member, said first portion extending substantially transversely with respect to a peripheral direction of said band, said first cutting edge having a second portion and a third portion that converge together at a predetermined location, said second end portion having a first clamping jaw protruding radially outwardly from said band, in the closed position, said first clamping jaw not being overlapped by said first end portion, and said first portion of said first cutting edge defining a projection that is oriented towards said first clamping jaw, said predetermined location being disposed adjacent to said first clamping jaw and opposite to said projection, said projection extending parallel to said band, and said first end portion having a second closure member protruding radially inward at an inclined angle, said second closure member extending over the entire axial width of said band, said first end portion having a second clamping jaw protruding radially outwardly from said band;

wherein, in the closed position, said first closure member and said second closure member engage each other so that said second closure member engages radially inside of said projection.

2. The clip according to claim 1, wherein said projection has an approximately trapezoidal shape.

3. The clip according to claim 1, wherein said first cutting edge has a second and a third portion which each have an equal length when the band is in a pre-bent position, transitions from a base of said projection to said second and said third portions are in the shape of a circular arc, in the pre-bent position, and said second portion and said third portion also converge together in the shape of a circular arc at a predetermined location that is disposed opposite to said projection.

4. The clip according to claim 3, wherein in the pre-bent position, the transitions from said base of said projection into said circular arcs are in the form of a circular arc.

5. The clip according to claim 3, wherein an intermediate member is disposed between each circular arc and the predetermined location, and said intermediate member merges into the circular arc in the transition from said base of said projection and also merges into the circular arc that converges between said first and second portions.

6. The clip according to claim 5, wherein each intermediate member is linear and is inclined with respect to the longitudinal axis of said band.

7. The clip according to claim 5, wherein each intermediate member has a rounded corner that projects into a hole which is defined by the cutting edge, and the portions of each intermediate member that are adjacent to the corner are linear.

8. The clip according to claim 7, wherein the linear portions of each intermediate member, which are adjacent to the corner, enclose a right angle.

9. The clip according to claim 3, wherein the first clamping jaw is in the form of an undulation in the band.

10. The clip according to claim 9, wherein the predetermined location, is disposed in a wall of the undulation that forms the first clamping jaw.

11. The clip according to claim 1, wherein the first closure member has a ridge that extends parallel to the band at least in a portion adjoining the projection.

12. The clip according to claim 1, wherein a second cutting edge is formed in the band at the end of the second closure member that is remote from the first cutting edge; and a third closure member, which corresponds in shape to the first closure member, is formed by said second cutting edge.

13. The clip according to claim 12, wherein the distance between the projections of the first and third closure member is equal to π times the difference in the diameters between two hoses that can be clamped using the first and third closure members, respectively.

14. The clip according to claim 1, wherein the first clamping jaw is in the form of an undulation in the band.

15. The clip according to claim 1, wherein the second clamping jaw is in the form of an undulation in the band.

16. The clip according to claim 15, wherein the second clamping jaw is in the form of an undulation in the band.

* * * * *

UNITED STATES PATENT AND TRADEMARK OFFICE
CERTIFICATE OF CORRECTION

PATENT NO. : 6,023,815

DATED : February 15, 2000

INVENTOR(S) : Heinz Sauer

It is certified that error appears in the above-identified patent and that said Letters Patent is hereby corrected as shown below:

Column 8, line 64, change "second" to --first--.

Signed and Sealed this

Fifth Day of December, 2000

*Attest:*

Q. TODD DICKINSON

*Attesting Officer*   *Director of Patents and Trademarks*